United States Patent [19]
De Bella

[11] 3,714,449
[45] Jan. 30, 1973

[54] PORTABLE ENGINE-GENERATOR POWER UNIT WITH COOLING

[75] Inventor: Gasper V. De Bella, Hillsborough, Calif.

[73] Assignee: Cal-West Electric Inc., San Francisco, Calif.

[22] Filed: May 5, 1971

[21] Appl. No.: 140,516

[52] U.S. Cl. .................................... 290/1, 290/1 C
[51] Int. Cl. ............................................. H02k 9/18
[58] Field of Search ........... 290/1, 1 A, 1 B, 1 C, 1 D; 60/39, 66

[56] References Cited

UNITED STATES PATENTS

| | | | |
|---|---|---|---|
| 3,536,928 | 10/1970 | Jones | 290/1 |
| 3,418,485 | 12/1968 | Anderson et al. | 290/1 |
| 3,514,219 | 5/1970 | Mitchell et al. | 290/1 X |
| 3,489,911 | 1/1970 | Varner et al. | 290/1 X |
| 2,789,234 | 4/1957 | Lambert et al. | 290/1 |
| 3,259,752 | 7/1966 | Honda | 290/1 |
| 2,799,782 | 7/1957 | Armstrong et al. | 290/1 |

*Primary Examiner*—G. R. Simmons
*Attorney*—Lothrop & West

[57] ABSTRACT

A portable engine-generator power unit has a rectangular base frame enclosing a fuel tank for the engine. An engine-generator set is mounted on beams spanning the base frame over the tank. A housing rests on the base frame and encloses the engine-generator set. The engine fan blows air received through ingress louvers in the housing through the engine radiator and then through a shroud having egress louvers in the housing. A loading coil connected to the generator is supported within the shroud which is hinged to be swung toward and away from the radiator.

1 Claim, 5 Drawing Figures

PATENTED JAN 30 1973
3,714,449
SHEET 1 OF 2
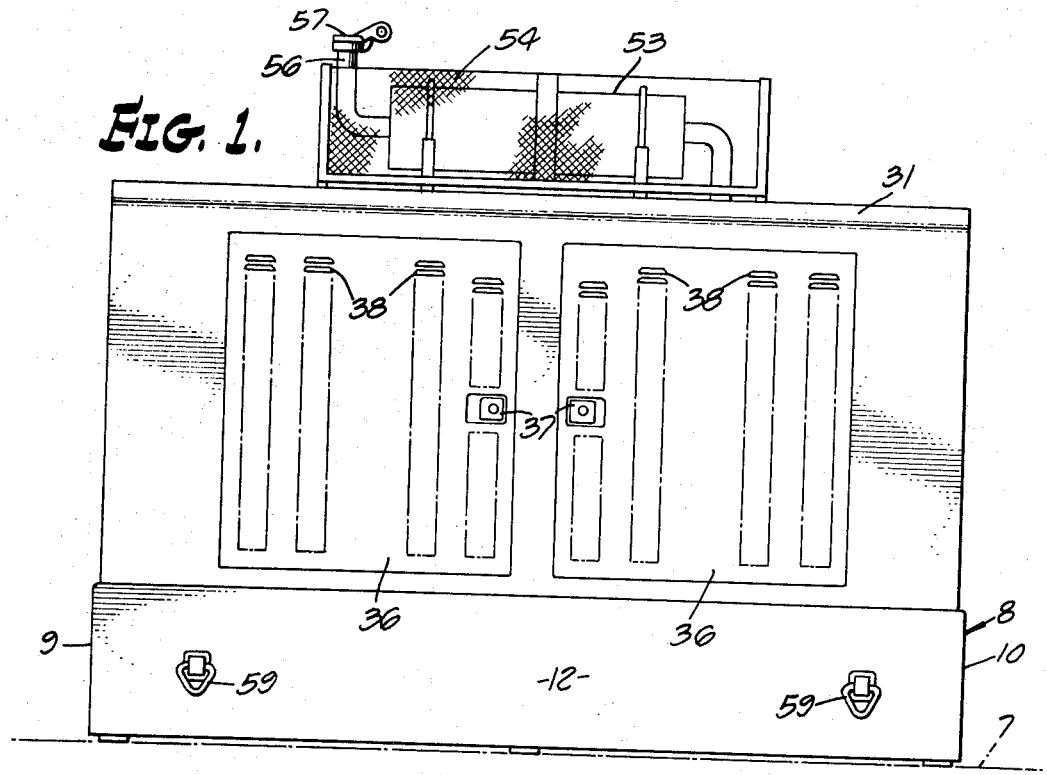
FIG. 1.
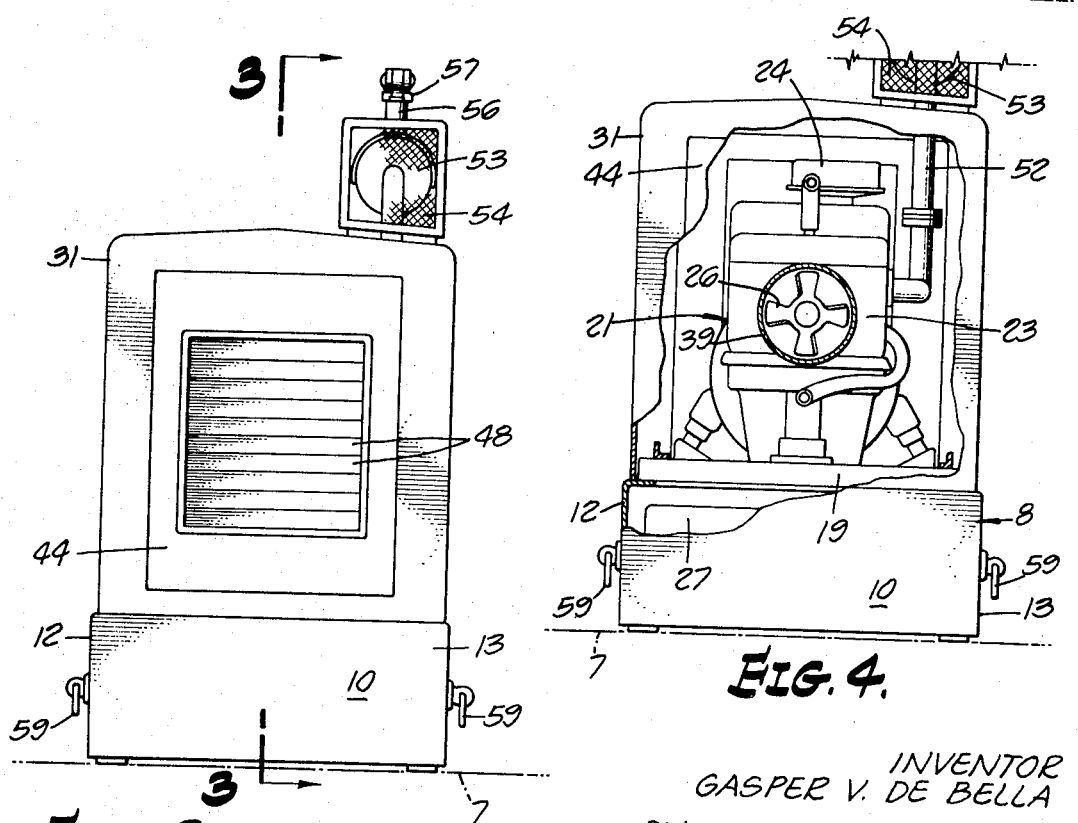
FIG. 2.
FIG. 4.
INVENTOR
GASPER V. DE BELLA
BY
Lothrop & West
ATTORNEYS INVENTOR
GASPER V. DE BELLA
BY Lothrop & West
ATTORNEYS

PORTABLE ENGINE-GENERATOR POWER UNIT WITH COOLING

The problem of supplying electric energy is complicated by the necessity of taking care of more or less temporary over-loads at different places and at different times. For that reason, there have come into use portable electric generator power units. These are generally self-sustaining and self-operating for a long period of time and include some sort of internal combustion engine driving an electrical generator easily connected to the lines in any locality to supply extra power. One of the difficulties in an installation of this sort is that it is often unknown just when, where and for how long the extra power will be needed so that it is economical to have a portable power plant that can quickly be moved from place to place and from time to time. The operation of the power plant in some locations can be readily arranged so that the engine does not overheat and so that the generator has adequate ventilation. Under other circumstances, however, particularly when the surrounding atmospheric conditions vary greatly and when the imposed load varies substantially, there is often a problem of power plant cooling as well as generator cooling. Furthermore, in the operation of the generator it is sometimes advantageous to have the generator supply a dummy load so that the engine and generator are both kept at good operating temperatures even though they are not supplying power to the connected power lines. In addition, the power plant is often located in an isolated area or in an unsavory area wherein there is likelihood of tampering and interference.

For the foregoing and other reasons it is an object of my invention to provide a portable engine-generator power unit in which great care is taken to provide proper ambient conditions not only for the engine-generator itself and its attendant auxiliaries, such as the radiator and fuel tank but likewise to provide a dummy loading coil for the generator, readily to maintain a proper operating temperature.

Another object of the invention is to provide a portable engine-generator power unit that is completely self-contained except for its connections to the power line and which can quite easily, upon making or breaking such connections, be moved from place to place with little difficulty and with virtually immediate availability.

Another object of the invention is to provide a portable engine-generator power plant which is stable and has good weight distribution so that it can readily be handled during transport from one place to another.

A further object of the invention is to provide a portable engine-generator power unit which is substantially enclosed so that it is well protected against pilferage, sabotage and mischief.

A further object of the invention is in general to provide an improved portable engine-generator power unit.

Other objects, together with the foregoing, are attained in the embodiment of the invention described in the accompanying description and illustrated in the accompanying drawings, in which:

FIG. 1 is a side elevation of a portable engine-generator power unit constructed in accordance with the invention;

FIG. 2 is an end elevation of the structure of FIG. 1;

FIG. 4 is a cross section, the planes of which are indicated by the lines 4—4 of FIG. 3.

Figure 3:
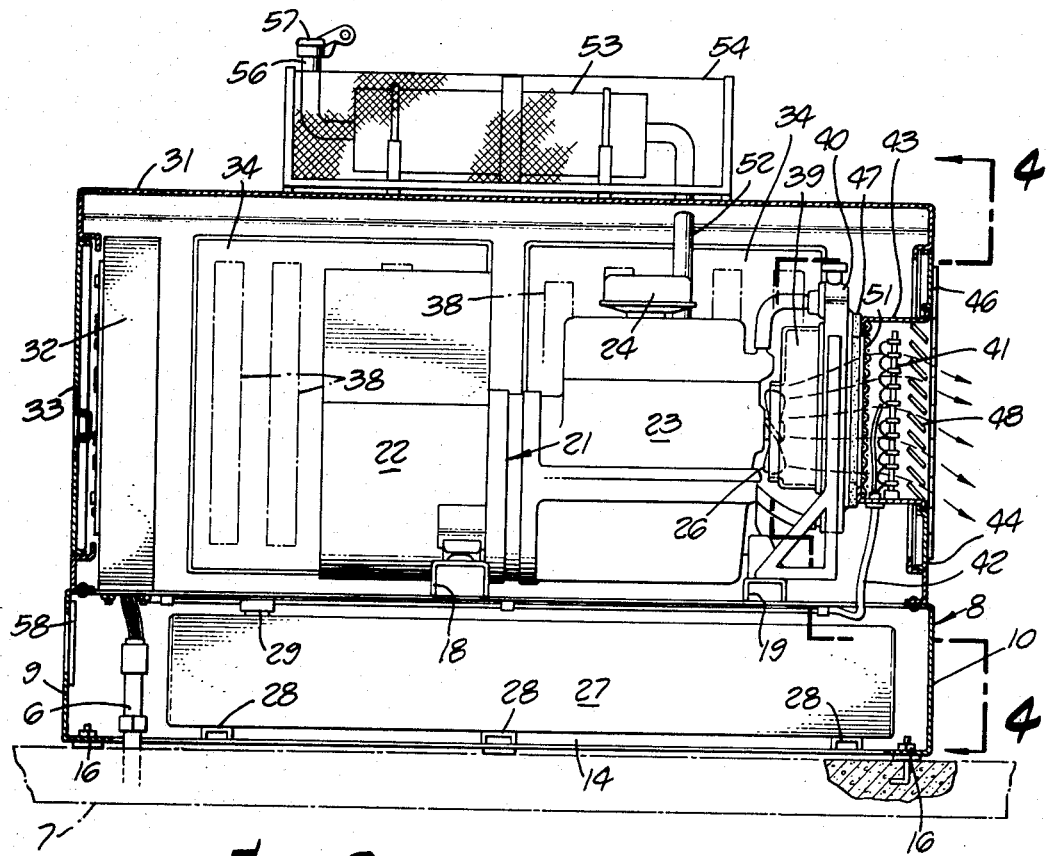
FIG. 3 is a cross section, the plane of which is indicated by the line 3—3 of FIG. 2.
Figure 5:
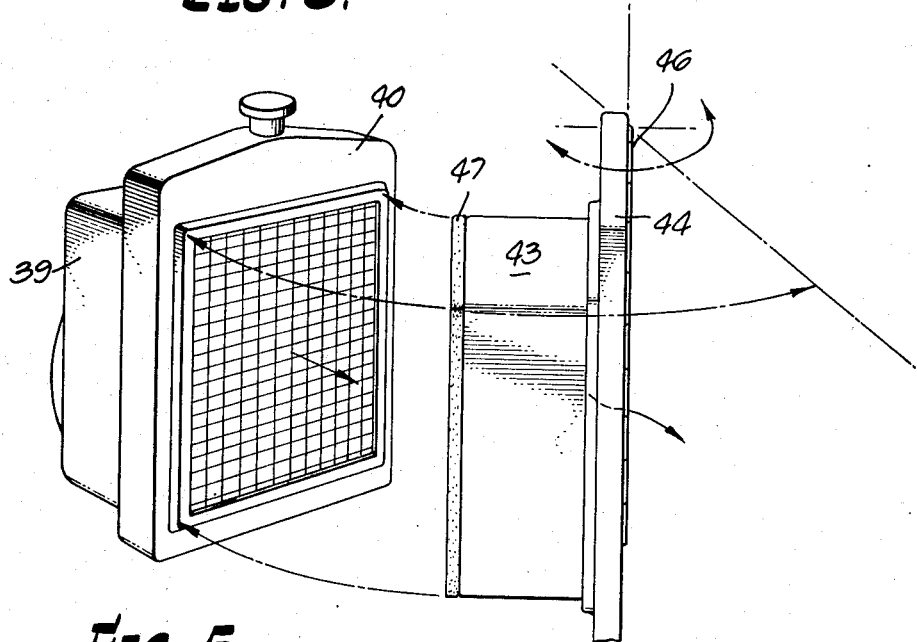
FIG. 5 is an exploded, isometric view showing the environment of the hinged shroud portion of the structure.

While the portable engine-generator power unit pursuant to the invention can be utilized in a number of different environments, it is particularly adapted for use in connection with an underground power line connector 6 (FIG. 3) which may be temporary or may be part of a permanently provided installation pad 7, for example a concrete slab or the like.

The power unit itself includes a base frame 8 conveniently fabricated of formed metal including a pair of end members 9 and 10 and a pair of parallel side members 12 and 13. The base frame members are preferably of channel shape inturned to define a generally rectangular enclosure 14 that is continuous around the sides but is open at the bottom and the top. The base frame is preferably secured to and spaced slightly above the slab 7 for a semi-permanent installation by appropriate fasteners 16 which can be readily detached in the event the unit is to be moved.

Spanning the enclosure and resting on the side members 12 and 13 are beams 18 and 19 serving as supports for an engine-generator set generally designated 21. This set includes the usual electric generator 22 directly coupled to an internal combustion engine 23 having the usual equipment, including an air intake structure 24 and a cooling fan 26. The fuel for the engine, supplied to the intake structure 24, is derived from a fuel tank 27 of generally rectangular configuration, preferably resting on beams 28 spanning the lower flanges of the base frame. The beams support the tank within the enclosure but well spaced from the side and end walls thereof and from the top and bottom so that there is an adequate air passage or volume entirely around the fuel tank. Since the tank when full is relatively heavy, it is preferably directly connected and fastened to the base frame so that the unit is relatively stable. The fuel tank is provided with a filler 29 accessible only through the open, upper portion of the base frame.

Enclosing the engine-generator set is a housing generally designated 31 comprised of various sheets of generally rectangular material. Around the bottom, the housing is secured to the upper portion of the base frame. The housing allows adequate air space around the generator 22 and the engine 23 and in fact is large enough to receive a control panel 32 disposed at one end thereof in juxtaposition to the power line connector 6. The panel 32 makes a close fit with the adjacent portions of the housing and is just behind a hinged housing door 33 which can normally be closed and locked. The panel 32 is usually inaccessible from the outside but can appropriately be reached when the door 33 is unlocked and swung open. The various controls therein are thus available only to those with proper keys.

The housing 31 includes on both sides a pair of doors 34 and 36 having hinge mounts so that they can readily be swung open and also having locks 37 so that the panels can be closed to prevent access to the interior of the housing. Each of the doors 34 and 36 is provided with a number of ingress louvers 38 so that atmospheric air can be drawn into the interior of the housing.

In order to provide adequate circulation within the housing so that the generator 22 is properly cooled and so that the engine 23 is similarly ventilated and cooled, the engine fan 26 is disposed at the inlet of an enclosure 39 on the upstream side of a radiator 40. The radiator is included in the hydraulic circuitry of the engine 23 in the usual way and the fan 26 is effective to take ambient air and to drive it through the radiator 40. The inlet air on the upstream side of the fan is derived from various of the ingress louvers 38 in the doors and also from the air volume surrounding the fuel tank 27 so that the housing interior and the tank itself are ventilated and are brought to and kept at the appropriate operating temperature.

Particularly in accordance with the invention and since there are times when the generator 22 does not have any or sufficient external load, I preferably provide a loading coil 41. This coil is connected by flexible conductors 42 and through the control panel 32 to the generator 22. The coil 41 is put in circuit with the generator whenever there is need for a dummy load. The coil 41 is preferably positioned on the downstream side of the radiator 40 and is supported within a shroud 43 considered as part of a door panel 44 included in the housing 31. The door panel 44 has a connecting hinge 46 along one side so that the door panel 44 and the shroud 43 can be swung as a unit outwardly away from the radiator 40 or can be swung as a unit inwardly into a position substantially abutting the radiator. Conveniently, a packing 47 or gasket is included with the shroud 43 so that a virtually air-tight seal against the radiator 40 is effectuated. The door panel 44 is provided with a lock just as are the other doors so that the integrity of the housing can be maintained.

The shroud 43 is in communication through a number of egress louvers 48 with the atmosphere so that upon operation of the fan 26 air derived from the housing interior is blown first through the enclosure 39 and then through the radiator 40 absorbing some heat therefrom and then such warmed air is blown over the coil 41 on its way through the shroud 43 and the louvers 48 to the atmosphere. Since the coil 41 is often not needed and since access to this portion of the structure is advisable, the swinging shroud has been provided so that when opened the radiator air has a freer discharge. The shroud preferably includes an intervening screen 51 so that when the shroud is carried outside of the enclosure by opening of the door panel 44 the loading coil 41 is still protected.

Since it is desired to maintain a temperature within the housing for the maximum or optimum operation of the engine and generator, the engine 23 is provided with an exhaust pipe 52 passing directly through the housing 31 and extending to a muffler 53 conveniently mounted on the upper portion of the housing. The hot muffler does not appreciably warm the housing interior since it is in the outside air. The muffler is contained within a protecting screen shell 54, the tail pipe 56 passing through the screen and being provided with a weather cap 57.

The power unit, provided with appropriate coolant fuel and lubricant, can readily be transported from any storage place and quickly installed on a foundation such as the pad 7 and can easily have the power line 6 connected to the corresponding portions within the panel 32. A normally closed hand hole 58 is provided for that purpose in the base frame. When the connections have been appropriately made, either a local or remote signal, preferably effective upon the panel 32, provides for starting the engine 23. This starts the fan as well and immediately provides air circulation through the housing around the tank 27, carrying away any fumes, and then through the loading coil shroud 43.

In the event the generator is not to go directly on the power line, the loading coil 41 is connected in the generator circuit and makes the unit do sufficient work to achieve and maintain a proper operating temperature. This is assisted and the loading coil is cooled by the air flowing through the radiator 40 and discharged to the atmosphere through the louvers 48. When the loading coil is not needed it is electrically disconnected and the radiator discharge air simply passes over them to the atmosphere as before, or the panel 44 swings the coil out of the way. The loading coil is cut in and cut out of the circuit as needed, usually by means of an automatic control in the panel 32. The unit is usually placed on the line 6 by automatic controls in the panel 32. The unit continues to work for as long as needed, the cooling arrangements and guided air flows being such that the operating temperatures are appropriate. The enclosure also is such that vandalism, tampering and mischief cannot readily be accomplished since the entire unit is under lock and key, including the fuel supplying arrangement.

When the unit is to be moved elsewhere, it is a relatively simple matter to disconnect the line 6 and to pick up the entire unit by lifting rings 59 on the base frame. Since the fuel tank is near the bottom and extends almost throughout the base frame, the center of gravity is relatively low and central so that lifting is balanced and easy. The transported unit at a new location can quickly be installed and reoperated as previously described.

What is claimed is:

1. A portable engine-generator power unit adapted to rest on a floor comprising a base frame including peripheral side and end members defining a substantially rectangular enclosure; means for supporting said base frame above said floor; a housing resting on said base frame, said housing including side walls and end walls secured to said base frame and including a roof continuing said side and end walls; a fuel tank mounted on said side members and spaced from said side members, said end members and said floor to leave tank air spaces therebetween; beams spanning said enclosure and resting on said side members; an engine-generator set supported on said beams above said fuel tank leaving an engine air space therebetween communicating with said tank air spaces, said set including an engine radiator and a fan for blowing an airstream from the upstream, engine side of said radiator to the opposite downstream side thereof; means defining an opening in one of said housing end walls; a door panel mounted to swing on said end wall and having an air outlet therein; a shroud on said door surrounding said outlet and adapted in one position of said door to engage said radiator around the path of said airstream on the downstream side of said radiator; a loading coil for said generator; means for mounting said loading coil on said shroud within said airstream therein; and flexible conductors connected between said generator and said loading coil.

* * * * *